United States Patent
Nakahata et al.

(10) Patent No.: US 12,152,128 B2
(45) Date of Patent: Nov. 26, 2024

(54) RUBBER COMPOSITION AND TIRE

(71) Applicant: Sumitomo Rubber Industries, Ltd., Hyogo (JP)

(72) Inventors: Shoko Nakahata, Kobe (JP); Kensuke Washizu, Kobe (JP); Takahiro Mabuchi, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 762 days.

(21) Appl. No.: 17/262,704

(22) PCT Filed: Jul. 23, 2019

(86) PCT No.: PCT/JP2019/028823
§ 371 (c)(1),
(2) Date: Jan. 22, 2021

(87) PCT Pub. No.: WO2020/022324
PCT Pub. Date: Jan. 30, 2020

(65) Prior Publication Data
US 2021/0230396 A1   Jul. 29, 2021

(30) Foreign Application Priority Data
Jul. 27, 2018   (JP) .................................. 2018-141903

(51) Int. Cl.
C08K 5/3445 (2006.01)
B60C 1/00 (2006.01)
C08K 3/04 (2006.01)
C08K 3/36 (2006.01)

(52) U.S. Cl.
CPC .......... C08K 5/3445 (2013.01); B60C 1/0016 (2013.01); C08K 3/04 (2013.01); C08K 3/36 (2013.01)

(58) Field of Classification Search
CPC .......... C08K 5/3445; C08K 3/04; C08K 3/36; B60C 1/0016
USPC ....................................................... 524/106
See application file for complete search history.

(56) References Cited

U.S. PATENT DOCUMENTS

2011/0183098 A1 * 7/2011 Hidalgo .................. C08J 3/243
523/439

FOREIGN PATENT DOCUMENTS

| CN | 101955592 A | 1/2011 | |
|---|---|---|---|
| CN | 104672472 A | 6/2015 | |
| CN | 107057136 A | 8/2017 | |
| EP | 0 390 012 A1 | 10/1990 | |
| EP | 1 942 136 A1 | 7/2008 | |
| JP | 04331249 A * | 11/1992 | |
| JP | H04331249 A | 11/1992 | |
| JP | 08020693 A * | 1/1996 | |
| JP | H0820693 A | 1/1996 | |
| JP | 2001081240 A * | 3/2001 | ............... C08J 3/24 |
| JP | 2008-163109 A | 7/2008 | |
| JP | 2008285524 A | 11/2008 | |
| JP | 2012503060 A | 2/2012 | |
| KR | 20180080830 A * | 7/2018 | |
| WO | 2009/049413 A1 | 4/2009 | |

OTHER PUBLICATIONS

International Search Report issued in PCT/JP2019/028823; mailed Oct. 29, 2019.

* cited by examiner

Primary Examiner — Kelechi C Egwim
(74) Attorney, Agent, or Firm — Studebaker & Brackett PC

(57) ABSTRACT

The present invention provides rubber compositions and tires which provide improved overall performance in terms of wet grip performance and dry grip performance. Included is a rubber composition having a hardness that reversibly changes with water, satisfying the relationships (1) and (2) below, and having a stress at break of 8.0 MPa or more, Hardness when dry−Hardness when water-wet≥1   (1)

wherein each hardness represents the JIS-A hardness at 25° C. of the rubber composition, 0.90≤Volume when water-wet/Volume when dry≤1.01   (2)

wherein each volume represents the volume at 25° C. of the rubber composition.

1 Claim, No Drawings

RUBBER COMPOSITION AND TIRE

TECHNICAL FIELD

The present invention relates to rubber compositions and tires.

BACKGROUND ART

In recent years, safety has become an increasingly important issue for all automobiles. This has created a need for further improving wet grip performance. To date, various studies have been made to improve wet grip performance, and many inventions directed to silica-containing rubber compositions have been reported (for example, Patent Literature 1). Wet grip performance may be greatly affected particularly by the properties of the rubber composition of the tread portion that contacts the road. Thus, a variety of technical improvements in rubber compositions for tire components such as treads have been proposed and put into practical use.

CITATION LIST

Patent Literature

Patent Literature 1: JP 2008-285524 A

SUMMARY OF INVENTION

Technical Problem

As a result of extensive studies, the present inventors have found that, although the wet grip performance of tires has greatly advanced with the technical improvements of silica-containing rubber compositions for treads, there still remains the major technical problem of changes in grip performance caused by, for example, changes in road conditions from dry to wet road, or from wet to dry road, and thus room for improvement exists.

The inventors have extensively investigated this problem and found that when the conventional rubber compounds change from a dry state where they are not wet with water to a so-called wet state where they are wet with water, they will not change in hardness or will become harder due to cooling with water. Thus, the road contact area may be reduced and therefore the wet grip performance tends to be reduced compared to the dry grip performance.

Hence, it has been found that the conventional techniques leave room for improvement to provide an overall improvement in wet grip performance and dry grip performance.

The present invention aims to solve the problem and provide rubber compositions and tires which provide improved overall performance in terms of wet grip performance and dry grip performance.

Solution to Problem

The present invention relates to a rubber composition, having a hardness that reversibly changes with water, satisfying the relationships (1) and (2) below, and having a stress at break of 8.0 MPa or more, $$\text{Hardness when dry} - \text{Hardness when water-wet} \geq 1 \quad (1)$$

wherein each hardness represents a JIS-A hardness at 25° C. of the rubber composition, $$0.90 \leq \text{Volume when water-wet/Volume when dry} \leq 1.01 \quad (2)$$

wherein each volume represents a volume at 25° C. of the rubber composition.

Preferably, the rubber composition contains at least one rubber component, and rubber molecules of the rubber component are crosslinked partially or fully by an ionic bond.

Preferably, a cation of the ionic bond is derived from at least one selected from the group consisting of metal elements, metalloid elements, and a nitrogen element, while an anion thereof is derived from at least one selected from the group consisting of halogen elements and an oxygen element.

Preferably, a percentage of crosslinks formed by ionic bonding is 0.1 to 100% based on 100% of total crosslinks in the rubber composition.

Preferably, the rubber composition contains, per 100 parts by mass of a total rubber component therein, at least 1.0 part by mass of at least one selected from the group consisting of carbon black and silica.

Preferably, the rubber composition is for use in treads.

The present invention also relates to a tire, including a tire component at least partially including the rubber composition.

Preferably, the tire component is a tread.

Advantageous Effects of Invention

The rubber composition of the present invention has a hardness that reversibly changes with water, and satisfies the relationships (1) and (2) and a predetermined stress at break. Such a rubber composition provides improved overall performance in terms of wet grip performance and dry grip performance.

DESCRIPTION OF EMBODIMENTS

The rubber composition of the present invention has a hardness that reversibly changes with water, and satisfies the relationships (1) and (2) below and a stress at break of 8.0 MPa or more. Thus, the rubber composition provides improved overall performance in terms of wet grip performance and dry grip performance.

$$\text{Hardness when dry} - \text{Hardness when water-wet} \geq 1 \quad (1)$$

In the relationship, each hardness represents the JIS-A hardness at 25° C. of the rubber composition.

$$0.90 \leq \text{Volume when water-wet/Volume when dry} \leq 1.01 \quad (2)$$

In the relationship, each volume represents the volume at 25° C. of the rubber composition.

The rubber composition has the above-mentioned effect. The reason for the effect is not exactly clear, but may be explained as follows.

The rubber composition of the present invention has a hardness that reversibly changes with water, and further satisfies the relationship (1). The relationship (1) indicates that the hardness when water-wet is lower than the hardness when dry. In other words, by "the rubber composition of the present invention has a hardness that reversibly changes with water, and further satisfies the relationship (1)", it is meant that the rubber composition has a hardness which is lower when water-wet than when dry and which reversibly changes in the presence of water.

Accordingly, when the road conditions change from dry to wet, the rubber composition gets wet with water and thereby has a reduced hardness, which makes it possible to reduce a decrease in grip performance (wet grip performance), resulting in good grip performance (wet grip performance). This is believed to be because if the hardness remains suitable for dry roads, sufficient grip performance cannot be obtained on wet roads where skidding is more likely to occur; in contrast, a reduced hardness leads to an increased road contact area, which makes it possible to reduce a decrease in grip performance (wet grip performance), resulting in good grip performance (wet grip performance).

On the other hand, when the road conditions change from wet to dry, the water-wet rubber composition gets dry and thereby has an increased hardness, which makes it possible to reduce a decrease in grip performance (dry grip performance), resulting in good grip performance (dry grip performance). This is believed to be because if the hardness remains suitable for wet roads, sufficient grip performance cannot be obtained on dry roads where skidding is less likely to occur; in contrast, an increased hardness, which is suitable for dry roads, makes it possible to reduce a decrease in grip performance (dry grip performance), resulting in good grip performance (dry grip performance).

Thus, the rubber composition having a hardness that reversibly changes with water, and further satisfying the relationship (1) provides an appropriate hardness depending on the water conditions on the road (wet or dry road), and therefore provides improved overall performance in terms of wet grip performance and dry grip performance.

Further, by satisfying the relationship (2) so that the volume changes only slightly with changes in hardness, it is possible to reduce negative impacts on other properties, including abrasion resistance, handling stability, and fuel economy. Moreover, a stress at break of 8.0 MPa or more leads to improved abrasion resistance.

Therefore, the rubber composition of the present invention having a hardness that reversibly changes with water and satisfying the relationship (1) provides improved overall performance in terms of wet grip performance and dry grip performance. Moreover, it makes it possible to suitably maintain the performance balance of tires.

Herein, the hardness and volume of the rubber composition refer to the hardness and volume, respectively, of the rubber composition having been vulcanized.

Herein, the phrase "hardness that reversibly changes with water" means that the hardness of the (vulcanized) rubber composition reversibly increases or decreases depending on the presence of water. It is sufficient that the hardness reversibly change when the state of the rubber composition changes, for example, as follows: dry-water-wet-dry. Here, the rubber composition in the former dry state may or may not have the same hardness as in the latter dry state.

Herein, the term "hardness when dry" refers to the hardness of the (vulcanized) rubber composition in the dry state, and specifically refers to the hardness of the (vulcanized) rubber composition which has been dried by the method described in EXAMPLES.

Herein, the term "hardness when water-wet" refers to the hardness of the (vulcanized) rubber composition in the water-wet state, and specifically refers to the hardness of the (vulcanized) rubber composition which has been wetted with water by the method described in EXAMPLES.

Herein, the term "volume when dry" refers to the volume of the (vulcanized) rubber composition in the dry state, and specifically refers to the volume of the (vulcanized) rubber composition which has been dried by the method described in EXAMPLES.

Herein, the term "volume when water-wet" refers to the volume of the (vulcanized) rubber composition in the water-wet state, and specifically refers to the volume of the (vulcanized) rubber composition which has been wetted with water by the method described in EXAMPLES.

Herein, the hardness (JIS-A hardness) of the (vulcanized) rubber composition is measured at 25° C. using a type A durometer in accordance with JIS K6253-3 (2012) "Rubber, vulcanized or thermoplastic-Determination of hardness-Part 3: Durometer method".

Herein, the volume of the (vulcanized) rubber composition represents the volume calculated from the length, width, and thickness of the composition measured at 25° C. when it has a rectangular parallelepiped shape.

As shown in the relationship (1), the value of "Hardness when dry–Hardness when water-wet" [(the hardness of the (vulcanized) rubber composition in the dry state)–(the hardness of the (vulcanized) rubber composition in the water-wet state)] is 1 or more, preferably 2 or more, more preferably 3 or more, still more preferably 4 or more, particularly preferably 5 or more, most preferably 6 or more, still most preferably 8 or more, further most preferably 9 or more, particularly most preferably 10 or more, and may be 11 or more. The upper limit is not limited but is preferably 50 or less, more preferably 40 or less, still more preferably 30 or less, particularly preferably 28 or less, most preferably 26 or less. When the value is within the range indicated above, the advantageous effect can be more suitably achieved.

The "Hardness when dry" (the hardness of the (vulcanized) rubber composition in the dry state) may be appropriately adjusted within the range satisfying the relationship (1). It is preferably 20 or more, more preferably 25 or more, still more preferably 30 or more, particularly preferably 40 or more, most preferably 42 or more, still most preferably 43 or more, further most preferably 44 or more, particularly most preferably 45 or more, and may be 46 or more, 47 or more, or 48 or more. It is also preferably 95 or less, more preferably 90 or less, still more preferably 85 or less, particularly preferably 75 or less, most preferably 70 or less, still most preferably 65 or less, further most preferably 60 or less. When the hardness is within the range indicated above, the advantageous effect can be more suitably achieved.

The "Hardness when water-wet" (the hardness of the (vulcanized) rubber composition in the water-wet state) may be appropriately adjusted within the range satisfying the relationship (1). It is preferably 20 or more, more preferably 25 or more, still more preferably 28 or more, particularly preferably 29 or more, most preferably 30 or more, still most preferably 31 or more, further most preferably 32 or more, particularly most preferably 33 or more, and may be 34 or more. It is also preferably 70 or less, more preferably 60 or less, still more preferably 50 or less, particularly preferably 40 or less, most preferably 38 or less, still most preferably 37 or less, further most preferably 36 or less. When the hardness is within the range indicated above, the advantageous effect can be more suitably achieved.

As shown in the relationship (2), the value of "Volume when water-wet/Volume when dry" [(the volume of the (vulcanized) rubber composition in the water-wet state)/(the volume of the (vulcanized) rubber composition in the dry state)] is at least 0.90 but not higher than 1.01, preferably at least 0.95 but not higher than 1.01, more preferably at least 0.99 but not higher than 1.01, particularly preferably 1.00 (no volume change). If the volume changes greatly with changes in hardness, other properties, including abrasion resistance, handling stability, and fuel economy, may be negatively affected. Thus, in order to maintain the performance balance of tires, it is important that the volume hardly change with changes in hardness.

A rubber composition having a hardness which changes as shown in the relationship (1) and which reversibly changes with water may be achieved, for example, by incorporating a substance capable of reversibly breaking or re-forming the ionic bond between rubber molecules through addition of water or drying. More specifically, when a rubber composition contains a combination of a rubber containing a halogen or oxygen with a compound containing a metal, metalloid, or nitrogen, it achieves a hardness which changes as shown in the relationship (1) and which reversibly changes with water. This is because owing to the combination, the cation derived from the metal, metalloid, or nitrogen and the anion derived from the halogen or oxygen form an ionic bond between the rubber molecules, which is then cleaved by addition of water and re-formed by drying of water, with the result that the hardness decreases when water-wet and increases when dry.

The hardness when dry can be adjusted by the type and amount of the chemicals (in particular, rubber components, fillers, softeners such as oil) incorporated in the rubber composition. For example, the hardness when dry tends to be reduced by increasing the amount of softeners; the hardness when dry tends to be increased by increasing the amount of fillers; and the hardness when dry tends to be reduced by decreasing the amount of sulfur. The hardness when dry can also be adjusted by varying the amount of sulfur and vulcanization accelerators. More specifically, increasing the amount of sulfur tends to increase the hardness when dry, while increasing the amount of vulcanization accelerators tend to increase the hardness when dry.

The hardness when water-wet can be adjusted, for example, by combining a rubber containing a halogen or oxygen with a compound containing a metal, metalloid, or nitrogen.

Specifically, when the hardness when dry is adjusted within the desired range, and further a rubber containing a halogen or oxygen is combined with a compound containing a metal, metalloid, or nitrogen, the rubber composition achieves a hardness which changes as shown in the relationship (1) and which reversibly changes with water. Moreover, it also achieves the above-specified hardness when dry and hardness when water-wet.

A rubber composition having a volume that changes only slightly as shown in the relationship (2) may also be achieved, for example, by incorporating a substance capable of reversibly breaking or re-forming the ionic bond between rubber molecules through addition of water or drying. More specifically, when a rubber composition contains a combination of a rubber containing a halogen or oxygen with a compound containing a metal, metalloid, or nitrogen, it achieves a volume that changes only slightly as shown in the relationship (2). This is because the cation derived from the metal, metalloid, or nitrogen and the anion derived from the halogen or oxygen form an ionic bond between the rubber molecules, and then, when water is added, cleavage of such ionic bonds between the rubber molecules occurs only very slightly so that the absorption of water into the polymer does not affect the volume; and when water is dried, re-formation of such ionic bonds occurs only very slightly so that the dehydration of the polymer does not affect the volume, with the result that the rubber composition has reduced changes in volume.

From standpoints such as rubber properties, the rubber composition ((vulcanized) rubber composition when dry) has a stress at break (tensile strength) of 8.0 MPa or more.

The stress at break is preferably 8.2 MPa or more, more preferably 8.3 MPa or more, still more preferably 8.4 MPa or more, particularly preferably 8.5 MPa or more, most preferably 8.6 MPa or more, still most preferably 8.8 MPa or more, further most preferably 8.9 MPa or more, particularly most preferably 9.0 MPa or more, and may be 9.1 MPa or more, 9.2 MPa or more, or 9.4 MPa or more. The upper limit of the stress at break is not limited but is preferably as high as possible.

The stress at break is measured on the vulcanized rubber composition at a standard test temperature (23±2° C.) in accordance with JIS K6251. Specifically, it can be measured as described later in EXAMPLES.

The stress at break (tensile strength) of a rubber composition can be adjusted to the predetermined value or more by the type and amount of the chemicals (in particular, rubber components, fillers, softeners such as oil) incorporated in the rubber composition. For example, the stress at break tends to be increased by reducing the amount of softeners or by increasing the amount of fillers.

The chemicals that may be used are described below.

The rubber composition contains at least one rubber component. In the rubber composition, the rubber molecules of the rubber component are preferably crosslinked partially or fully by an ionic bond. When the crosslinks of the polymer component (rubber component) include an ionic bond, the hardness can be reduced only when wet with water due to the reversibility of the non-covalent ionic bond. Moreover, since ionic bonds have the strongest bond strength among non-covalent bonds, sufficient bond strength can be maintained when dry.

The percentage of crosslinks formed by ionic bonding is preferably 0.1% or more, more preferably 0.5% or more, still more preferably 1% or more, based on 100% of the total crosslinks in the rubber composition. When the percentage is not less than the lower limit, good wet grip performance and good dry grip performance tend to be obtained. The upper limit is not limited and may be 100%. However, it is preferably 80% or less, more preferably 70% or less.

The percentage of crosslinks formed by ionic bonding can be measured as described later in EXAMPLES.

The ionic bond between the rubber molecules is not limited and may be, for example, an ionic bond in which the cation is derived from at least one selected from the group consisting of metal elements, metalloid elements, and a nitrogen element, while the anion is derived from at least one selected from the group consisting of halogen elements and an oxygen element. Any combination of at least one selected from the group consisting of metal elements, metalloid elements, and a nitrogen element, with at least one selected from the group consisting of halogen elements and an oxygen element may be used, including specifically combinations of metal elements as the cation with halogen elements as the anion, combinations of metal elements as the cation with an oxygen element as the anion, combinations of metalloid elements as the cation with halogen elements as the anion, combinations of metalloid elements as the cation with an oxygen element as the anion, combinations of a nitrogen element as the cation with halogen elements as the anion, and a combination of a nitrogen element as the cation with an oxygen element as the anion.

Examples of the metal elements as the cation include alkali metals (e.g., lithium, sodium, potassium) and alkaline earth metals (e.g., magnesium, calcium, strontium). Examples of the metalloid elements include silicon, boron, and germanium. Examples of compounds capable of supplying a nitrogen atom as the cation include nitrogen-containing compounds (e.g., ammonia, amines) which can form cations such as quaternary ammonium salts. Examples of the halogen elements as the anion include chlorine and bromine.

For example, when a rubber component containing a halogen element or an oxygen element is combined with a compound containing a metal element, metalloid element, or nitrogen element, an ionic bond is formed between the rubber molecules. In this case, the halogen element or oxygen element of the rubber component constitutes the anion of the ionic bond, while the metal element, metalloid element, or nitrogen element of the compound constitutes the cation of the ionic bond.

From the standpoint of well achieving the above-mentioned effect, the rubber composition preferably contains a rubber component containing at least one selected from the group consisting of halogen elements and an oxygen element.

Examples of the rubber component containing at least one halogen element and/or oxygen element include diene rubbers containing at least one halogen element and/or oxygen element in the molecule, such as isoprene-based rubbers, polybutadiene rubber (BR), styrene-butadiene rubber (SBR), styrene-isoprene-butadiene rubber (SIBR), acrylonitrile butadiene rubber (NBR), and chloroprene rubber (CR); and butyl-based rubbers containing at least one halogen element and/or oxygen element in the molecule. The rubber component may include a single rubber or a combination of two or more rubbers. Preferred among these are butyl-based rubbers containing at least one halogen element and/or oxygen element in the molecule.

Examples of the butyl-based rubbers containing at least one halogen element and/or oxygen element in the molecule include halogenated butyl rubbers (X-IIR) such as brominated butyl rubber (BR-IIR) and chlorinated butyl rubber (Cl-IIR). These may be used alone or in combinations of two or more. To more suitably achieve the advantageous effect, BR-IIR is more preferred among these.

Examples of commercial products of the butyl-based rubbers include those available from Exxon Mobil Corporation, JSR Corporation, and Japan Butyl Co., Ltd.

The amount of the "rubber component containing at least one selected from the group consisting of halogen elements and an oxygen element" based on 100% by mass of the total rubber component is preferably 50% by mass or more, more preferably 70% by mass or more, still more preferably 80% by mass or more. When the amount is not less than the lower limit, good wet grip performance and good dry grip performance tend to be obtained. The upper limit is not limited and may be 100% by mass. The amount of the butyl-based rubbers containing at least one selected from the group consisting of halogen elements and an oxygen element is also preferably within the same range.

From the standpoint of well achieving the above-mentioned effect, the rubber composition preferably contains a compound containing at least one selected from the group consisting of metal elements, metalloid elements, and a nitrogen element.

The compound may be a compound capable of forming an ionic bond as a cation. In particular, the compound is preferably a compound containing a nitrogen element, for example, a nitrogen-containing compound which can form a cation such as a quaternary ammonium salt.

Specific examples of the compound containing a nitrogen element include 1,2-dimethylimidazole, N-butylimidazole, N-(trimethylsilyl) imidazole, N-decyl-2-methylimidazole, N-hydroxyethylimidazole, N-(3-trimethoxysilylpropyl) imidazole, N-vinylimidazole, and 1-butylbenzimidazole; and trimethylamine, triethylamine, triisopropylamine, tri-n-butylamine, trimethylphosphine, triethylphosphine, triisopropylphosphine, tri-n-butylphosphine, and triphenylphosphine. These may be used alone or in combinations of two or more. Among these, imidazole compounds such as N-butylimidazole are preferred.

For example, when the rubber component containing at least one halogen element and/or oxygen element is brominated butyl rubber (BR-IIR), and the compound containing at least one metal element, metalloid element, and/or nitrogen element is N-butylimidazole, it is considered that an ionic bond as represented by the following formula is formed.

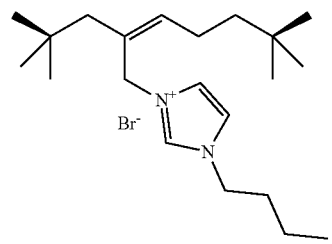

The amount of the "compound containing at least one selected from the group consisting of metal elements, metalloid elements, and a nitrogen element" per 100 parts by mass of the total rubber component is preferably 0.5 parts by mass or more, more preferably 1 part by mass or more, still more preferably 2 parts by mass or more, particularly preferably 3 parts by mass or more, most preferably 5 parts by mass or more, but is preferably 30 parts by mass or less, more preferably 20 parts by mass or less, still more preferably 10 parts by mass or less, further preferably 7 parts by mass or less. When the amount is within the range indicated above, the advantageous effect tends to be better achieved.

From the standpoint of better achieving the advantageous effect, the rubber composition preferably contains at least one selected from the group consisting of carbon black and silica. Among these, the rubber composition preferably contains carbon black to more suitably provide good wet grip performance and good abrasion resistance. For example, it may suitably be a rubber composition which contains a rubber component satisfying any of the combinations listed for the cation and anion of the ionic bond, and at least one selected from the group consisting of carbon black and silica, or a rubber composition which contains the rubber component and at least carbon black.

The amount (combined amount) of the "at least one selected from the group consisting of carbon black and silica" per 100 parts by mass of the total rubber component is preferably 0.5 parts by mass or more, more preferably 1.0 part by mass or more, still more preferably 30 parts by mass or more, but is preferably 150 parts by mass or less, more preferably 100 parts by mass or less, still more preferably 80 parts by mass or less, particularly preferably 60 parts by mass or less, most preferably 50 parts by mass or less. When the amount is within the range indicated above, the advantageous effect tends to be better achieved.

Examples of the carbon black include those commonly used in the tire industry, such as GPF, HAF, ISAF, and SAF. These may be used alone or in combinations of two or more.

The carbon black preferably has a BET specific surface area of 50 $m^2/g$ or more, more preferably 100 $m^2/g$ or more, still more preferably 120 m²/g or more. When the BET specific surface area is not less than the lower limit, sufficient wet grip performance and abrasion resistance tend to be obtained. The upper limit is preferably 200 m²/g or less, more preferably 180 m²/g or less. When the BET specific surface area is within the range indicated above, the advantageous effect tends to be better achieved. When the BET specific surface area is not more than the upper limit, good dispersion tends to be obtained, resulting in excellent abrasion resistance.

The BET specific surface area of the carbon black is measured by the BET method in accordance with ASTM D6556.

The carbon black preferably has a dibutylphthalate oil absorption (DBP) of 50 mL/100 g or more, more preferably 100 mL/100 g or more. When the DBP is not less than the lower limit, sufficient wet grip performance and abrasion resistance tend to be obtained. The DBP of the carbon black is also preferably 220 mL/100 g or less, more preferably 180 mL/100 g or less. When the DBP is not more than the upper limit, good dispersion tends to be obtained, resulting in excellent abrasion resistance.

The DBP of the carbon black is measured in accordance with JIS K6217-4:2001.

The carbon black may be a commercial product of, for example, Asahi Carbon Co., Ltd., Cabot Japan K.K., Tokai Carbon Co., Ltd., Mitsubishi Chemical Corporation, Lion Corporation, NSCC Carbon Co., Ltd, or Columbia Carbon.

The amount of the carbon black per 100 parts by mass of the total rubber component is preferably 0.5 parts by mass or more, more preferably 1.0 part by mass or more, still more preferably 30 parts by mass or more, but is preferably 150 parts by mass or less, more preferably 100 parts by mass or less, still more preferably 80 parts by mass or less, particularly preferably 60 parts by mass or less, most preferably 50 parts by mass or less. When the amount is within the range indicated above, the advantageous effect tends to be better achieved.

In the rubber composition, the amount of the carbon black based on 100% by mass of the combined amount of the carbon black and silica is preferably 10% by mass or more, more preferably 20% by mass or more, still more preferably 30% by mass or more. The upper limit is not limited and may be 100% by mass. When the amount is within the range indicated above, the advantageous effect tends to be more suitably achieved.

Examples of the silica include dry silica (silicic acid anhydride) and wet silica (hydrous silicic acid). Wet silica is preferred because it contains a large number of silanol groups. These may be used alone or in combinations of two or more.

The silica has a nitrogen adsorption specific surface area ($N_2SA$) of 40 m²/g or more, preferably 60 m²/g or more, more preferably 80 m²/g or more, still more preferably 160 m²/g or more. The $N_2SA$ is also preferably 600 m²/g or less, more preferably 300 m²/g or less, still more preferably 250 m²/g or less, particularly preferably 200 m²/g or less. When the $N_2SA$ is within the range indicated above, the advantageous effect tends to be more suitably achieved.

Herein, the $N_2SA$ of the silica is determined by the BET method in accordance with ASTM D3037-81.

The silica may be a commercial product of, for example, Degussa, Rhodia, Tosoh Silica Corporation, Solvay Japan, or Tokuyama Corporation.

The amount of the silica per 100 parts by mass of the total rubber component is preferably 5 parts by mass or more, more preferably 10 parts by mass or more, still more preferably 15 parts by mass or more, but is preferably 150 parts by mass or less, more preferably 100 parts by mass or less, still more preferably 80 parts by mass or less, particularly preferably 60 parts by mass or less, most preferably 40 parts by mass or less. When the amount is within the range indicated above, the advantageous effect tends to be better achieved.

The rubber composition containing silica preferably further contains a silane coupling agent.

Any silane coupling agent may be used, and examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl) tetrasulfide, bis(2-triethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Examples of usable commercially available silane coupling agents include products of Degussa, Momentive, Shin-Etsu Silicone, Tokyo Chemical Industry Co., Ltd., AZmax. Co., and Dow Corning Toray Co., Ltd. These may be used alone or in combinations of two or more. Among these, sulfide silane coupling agents and mercapto silane coupling agents are preferred because then the advantageous effect tends to better achieved. More preferred are disulfide silane coupling agents having disulfide bonds such as bis(3-triethoxysilylpropyl)disulfide.

The amount of the silane coupling agent per 100 parts by mass of the silica is preferably 3 parts by mass or more, more preferably 5 parts by mass or more, but is preferably 20 parts by mass or less, more preferably 15 parts by mass or less. When the amount is within the range indicated above, the advantageous effect tends to be better achieved.

The rubber composition may contain an oil.

Examples of the oil include process oils, plant oils, and mixtures thereof. Examples of the process oils include paraffinic process oils, aromatic process oils, and naphthenic process oils. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone or in combinations of two or more. To well achieve the advantageous effect, process oils are preferred among these, with aromatic process oils being more preferred.

The oil may be a commercial product of, for example, Idemitsu Kosan Co., Ltd., Sankyo Yuka Kogyo K.K., Japan Energy Corporation, Olisoy, H&R, Hokoku Corporation, Showa Shell Sekiyu K.K., or Fuji Kosan Co., Ltd.

The amount of the oil per 100 parts by mass of the total rubber component is preferably 5 parts by mass or more, more preferably 10 parts by mass or more, still more preferably 20 parts by mass or more, but is preferably 50 parts by mass or less, more preferably 35 parts by mass or less. When the amount is within the range indicated above, the advantageous effect tends to be better achieved. The amount of the oil includes the amount of the oil, if present in the rubbers (oil extended rubbers) used.

The rubber composition may contain a resin.

Any resin generally used in the tire industry may be used, and examples include rosin-based resins, coumarone indene resins, α-methylstyrene-based resins, terpene-based resins, p-t-butylphenol acetylene resins, acrylic resins, C5 resins, and C9 resins. Examples of usable commercially available resins include products of Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries, Ltd., Taoka Chemical Co., Ltd., and Toagosei Co., Ltd. These may be used alone or in combinations of two or more.

The amount of the resin per 100 parts by mass of the total rubber component is preferably 1 part by mass or more, more preferably 5 parts by mass or more, but is preferably 30 parts by mass or less, more preferably 20 parts by mass or less. When the amount is within the range indicated above, the advantageous effect tends to be better achieved.

The rubber composition may contain a wax.

Non-limiting examples of the wax include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Among these, petroleum waxes are preferred, with paraffin waxes being more preferred.

The wax may be a commercial product of, for example, Ouchi Shinko Chemical Industrial Co., Ltd., Nippon Seiro Co., Ltd., or Seiko Chemical Co., Ltd.

The amount of the wax per 100 parts by mass of the total rubber component is preferably 0.3 parts by mass or more, more preferably 0.5 parts by mass or more, but is preferably 20 parts by mass or less, more preferably 10 parts by mass or less. When the amount is within the range indicated above, the advantageous effect tends to be better achieved.

The rubber composition may contain an antioxidant.

Examples of the antioxidant include naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis [methylene-3-(3',5'-di-t-butyl-4'-hydroxyphenyl)-propionate]methane. These may be used alone or in combinations of two or more. Among these, p-phenylenediamine antioxidants and quinoline antioxidants are preferred.

The antioxidant may be a commercial product, of, for example, Seiko Chemical Co., Ltd., Sumitomo Chemical Co., Ltd., Ouchi Shinko Chemical Industrial Co., Ltd., or Flexsys.

The amount of the antioxidant per 100 parts by mass of the total rubber component is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain stearic acid.

The stearic acid may be a conventional one, such as that available from, for example, NOF Corporation, Kao Corporation, FUJIFILM Wako Pure Chemical Corporation, or Chiba Fatty Acid Co., Ltd.

The amount of the stearic acid per 100 parts by mass of the total rubber component is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain zinc oxide.

The zinc oxide may be a conventional one, such as that available from, for example, Mitsui Mining & Smelting Co., Ltd., Toho Zinc Co., Ltd., HakusuiTech Co., Ltd., Seido Chemical Industry Co., Ltd., or Sakai Chemical Industry Co., Ltd.

The amount of the zinc oxide per 100 parts by mass of the total rubber component is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be a commercial product of, for example, Tsurumi Chemical Industry Co., Ltd., Karuizawa sulfur Ltd., Shikoku Chemicals Corporation, Flexsys, Nippon Kanryu Industry Co., Ltd., or Hosoi Chemical Industry Co., Ltd.

The amount of the sulfur per 100 parts by mass of the total rubber component is preferably 0.1 parts by mass or more, more preferably 0.5 parts by mass or more, but is preferably 10 parts by mass or less, more preferably 5 parts by mass or less, still more preferably 3 parts by mass or less. When the amount is within the range indicated above, the advantageous effect tends to be better achieved.

The rubber composition may contain a vulcanization accelerator.

Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-tert-butyl-2-benzothiazolylsulfenamide, N-oxyethylene-2-benzothiazole sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. To more suitably achieve the advantageous effect, sulfenamide vulcanization accelerators and guanidine vulcanization accelerators are preferred among these.

The vulcanization accelerator may be a commercial product of, for example, Kawaguchi Chemical Industry Co., Ltd. or Ouchi Shinko Chemical Industrial Co., Ltd.

The amount of the vulcanization accelerator per 100 parts by mass of the total rubber component is preferably 1 part by mass or more, more preferably 2 parts by mass or more, but is preferably 10 parts by mass or less, more preferably 7 parts by mass or less. When the amount is within the range indicated above, the advantageous effect tends to be better achieved.

In addition to the above-mentioned components, the rubber composition may further contain additives commonly used in the tire industry, including, for example, organic peroxides, and fillers such as calcium carbonate, talc, alumina, clay, aluminum hydroxide, and mica. The amount of such additives per 100 parts by mass of the total rubber component is preferably 0.1 to 200 parts by mass.

The rubber composition may be prepared, for example, by kneading the components in a rubber kneading machine such as an open roll mill or Banbury mixer, and vulcanizing the kneaded mixture.

The kneading conditions are as follows: in a base kneading step of kneading additives other than vulcanizing agents and vulcanization accelerators, the kneading temperature is usually 100 to 180° C., preferably 120 to 170° C.; and in a final kneading step of kneading the vulcanizing agents and vulcanization accelerators, the kneading temperature is usually 120° C. or lower, preferably 80 to 110° C. Then, the composition obtained by kneading the vulcanizing agents and vulcanization accelerators is usually vulcanized by press vulcanization, for example. The vulcanization temperature is usually 140 to 190° C., preferably 150 to 185° C. The vulcanization time is usually 5 to 15 minutes.

The rubber composition may be used in tire components (i.e., as a rubber composition for tires) such as treads (cap treads), sidewalls, base treads, undertreads, shoulders, clinches, bead apexes, breaker cushion rubbers, rubbers for carcass cord topping, insulations, chafers, and innerliners, as well as side reinforcement layers of run-flat tires. The rubber composition is especially suitable for use in tire components which may be in contact with water (treads, sidewalls, shoulders), more suitably in treads. In the case of a tread consisting of a cap tread and a base tread, the rubber composition may be suitably used in the cap tread.

Examples of the tire components which may be in contact with water include components located at the outermost surface of new tires or of running tires which are being worn (treads, sidewalls, shoulders).

The tire (e.g., pneumatic tire) of the present invention can be produced from the rubber composition by usual methods. Specifically, the unvulcanized rubber composition containing additives as needed may be extruded according to the shape of a tire component (in particular, a tread (cap tread)) and formed and assembled with other tire components in a tire building machine by a usual method to build an unvulcanized tire, which may then be heated and pressurized in a vulcanizer to produce a tire.

It is sufficient that the tire component (e.g., tread) of the tire at least partially include the rubber composition. The whole tire component may include the rubber composition.

The tire is suitable for use as, for example, a tire for passenger vehicles, large passenger vehicles, large SUVs, trucks and buses, or two-wheeled vehicles, or as a racing tire, studless winter tire (winter tire), all-season tire, run-flat tire, aircraft tire, or mining tire.

EXAMPLES

The present invention is specifically described with reference to, but not limited to, examples.

The chemicals used in the examples and comparative examples are listed below.

Bromobutyl rubber: BUROMOBUTYL 2244 available from JSR Corporation
Chlorobutyl rubber: HT-1068 available from Exxon Mobil Corporation
1,2-Dimethylimidazole: CUREZOL 1.2DMZ available from Shikoku Chemicals Corporation
1-Butylimidazole: a commercial product
Carbon black: Seast 9H (DBP oil absorption: 115 mL/g, BET specific surface area: 110 m$^2$/g) available from Tokai Carbon Co., Ltd.
Silica: ULTRASIL VN3 ($N_2$SA: 175 m$^2$/g) available from Evonik Degussa
Silane coupling agent: Si69 (bis(3-triethoxysilyl-propyl) tetrasulfide) available from Evonik Degussa
Stearic acid: stearic acid "TSUBAKI" available from NOF Corporation
Zinc oxide: zinc oxide #2 available from Mitsui Mining & Smelting Co., Ltd.
Sulfur: powdered sulfur available from Tsurumi Chemical Industry Co., Ltd.
Vulcanization accelerator 1: NOCCELER NS (N-tert-butyl-2-benzothiazylsulfenamide) available from Ouchi Shinko Chemical Industrial Co., Ltd.
Vulcanization accelerator 2: NOCCELER D (1,3-diphenylguanidine) available from Ouchi Shinko Chemical Industrial Co., Ltd.

(Examples and Comparative Examples)

According to the formulation shown in each table, the chemicals other than the sulfur and vulcanization accelerators were kneaded using a 1.7 L Banbury mixer (Kobe Steel, Ltd.) at 160° C. for four minutes to give a kneaded mixture. Then, the kneaded mixture was kneaded with the sulfur and vulcanization accelerators in an open roll mill at 80° C. for four minutes to give an unvulcanized rubber composition.

The unvulcanized rubber composition was press-vulcanized at 170° C. for 12 minutes to give a vulcanized rubber composition.

The vulcanized rubber compositions prepared as above were evaluated as described below. The tables show the results. It should be noted that Comparative Examples 1-1 and 2-1 are used as standards of comparison in Tables 1 and 2, respectively.

(Hardness (Hs) of Vulcanized Rubber)

The shore hardness (Hs, JIS-A hardness) of the vulcanized rubber compositions (test specimens) was measured using a type A durometer in accordance with JIS K6253-3 (2012) "Rubber, vulcanized or thermoplastic—Determination of hardness—Part 3: Durometer method". The measurement was carried out at 25° C.

(Hardness when Water-Wet)

The vulcanized rubber compositions (having a rectangular parallelepiped shape of 30 mm×30 mm×4 mm) were immersed in 20 mL of water at 25° C. for six hours to give water-wet vulcanized rubber compositions. The hardness of the water-wet vulcanized rubber compositions was determined as described above and reported as hardness when water-wet.

(Hardness when Dry)

The water-wet vulcanized rubber compositions were dried under reduced pressure at 80° C. and 1 kPa or less until they reached a constant weight, thereby obtaining dried vulcanized rubber compositions. After the temperature of the dried vulcanized rubber compositions was returned to 25° C., the hardness of the dried vulcanized rubber compositions was determined as described above and reported as hardness when dry.

(Hardness when Re-Wet with Water)

The dried vulcanized rubber compositions (having a rectangular parallelepiped shape of 30 mm×30 mm×4 mm) were immersed in 20 mL of water at 25° C. for six hours to give vulcanized rubber compositions re-wet with water. The hardness of the vulcanized rubber compositions re-wet with water was determined as described above and reported as hardness when re-wet with water.

(Volume when Water-Wet, Volume when Dry)

The volume when water-wet was determined as follows: The vulcanized rubber compositions (having a rectangular parallelepiped shape of 30.0 mm in length×30.0 mm in width×0.50 mm in thickness) were immersed in 20 ml of water at 25° C. for 12 hours to give water-wet vulcanized rubber compositions. The length, width, and thickness of the water-wet vulcanized rubber compositions were measured at 25° C. and used to calculate the volume when water-wet.

The volume when dry was determined as follows: The water-wet vulcanized rubber compositions were left to dry at 25° C. under a normal pressure until they reached a constant weight, thereby obtaining dried vulcanized rubber compositions. After the temperature of the dried vulcanized rubber compositions was returned to 25° C., the volume of the dried vulcanized rubber compositions was determined as described above and reported as volume when dry.

Then, a ratio of the volume when water-wet to the volume when dry was calculated. The "No" in the tables indicates no volume change (volume when water-wet/volume when dry=1.00).

(Tensile Test)

The stress at break (tensile strength) was measured in accordance with JIS K6251 "Rubber, vulcanized or thermoplastic—Determination of tensile stress-strain properties". A higher value indicates that the rubber compound has a higher mechanical strength and thus better rubber properties.

(Ionic Bond Percentage (Percentage of Crosslinks Formed by Ionic Bonding)

The percentage can be determined from the amounts of the ingredients incorporated.

(Wet Grip Performance Index)

The unvulcanized rubber composition sheets were each formed into a tread shape and assembled with other tire components, followed by press-vulcanization at 170° C. for 12 minutes to prepare a kart tire (tire size: 11×1.10–5). Each set of kart tires were mounted on a kart. A test driver drove the kart eight laps around a test track of 2 km per lap which was previously sprinkled with water. Then, the driver rated the grip performance on a scale of 1 to 200 (best), where the grip performance of the standard comparative example was set equal to 100.

(Dry Grip Performance Index)

The unvulcanized rubber composition sheets were each formed into a tread shape and assembled with other tire components, followed by press-vulcanization at 170° C. for 12 minutes to prepare a kart tire (tire size: 11×1.10–5). Each set of kart tires were mounted on a kart. A test driver drove the kart eight laps around a test track of 2 km per lap under dry road conditions. Then, the driver rated the grip performance on a scale of 1 to 200 (best), where the grip performance of the standard comparative example was set equal to 100.

TABLE 1

| | | Example | | | | | | | | | | | | | Comparative Example | |
|---|---|---|---|---|---|---|---|---|---|---|---|---|---|---|---|---|
| | | 1-1 | 1-2 | 1-3 | 1-4 | 1-5 | 1-6 | 1-7 | 1-8 | 1-9 | 1-10 | 1-11 | 1-12 | 1-13 | 1-1 | 1-2 |
| Amount (parts by mass) | Bromobutyl rubber | 100 | 100 | 100 | 100 | 100 | 100 | — | — | — | — | — | — | 100 | 100 | 100 |
| | Chlorobutyl rubber | — | — | — | — | — | — | 100 | 100 | 100 | 100 | 100 | 100 | — | — | — |
| | 1,2-Dimethylimidazole | 3 | 5 | 7 | 10 | 20 | 30 | 3 | 5 | 7 | 10 | 20 | 30 | — | — | 3 |
| | 1-Butylimidazole | — | — | — | — | — | — | — | — | — | — | — | — | 3 | — | — |
| | Carbon black | 1 | 1 | 1 | 1 | 1 | 1 | 1 | 1 | 1 | 1 | 1 | 1 | 1 | 1 | — |
| | Stearic acid | 2 | 2 | 2 | 2 | 2 | 2 | 2 | 2 | 2 | 2 | 2 | 2 | 2 | 2 | 2 |
| | Zinc oxide | 2 | 2 | 2 | 2 | 2 | 2 | 2 | 2 | 2 | 2 | 2 | 2 | 2 | 2 | 2 |
| | Vulcanization accelerator 1 | 2 | 2 | 2 | 2 | 2 | 2 | 2 | 2 | 2 | 2 | 2 | 2 | 2 | 2 | 2 |
| | Vulcanization accelerator 2 | 2 | 2 | 2 | 2 | 2 | 2 | 2 | 2 | 2 | 2 | 2 | 2 | 2 | 2 | 2 |
| | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Evaluation results | Hardness of vulcanized rubber | 45 | 44 | 42 | 42 | 40 | 40 | 47 | 47 | 45 | 43 | 41 | 40 | 47 | 30 | 42 |
| | Hardness when water-wet (Hs(Wet)) | 34 | 34 | 31 | 33 | 30 | 29 | 37 | 38 | 36 | 34 | 31 | 31 | 36 | 30 | 32 |
| | Hardness when dry | 44 | 44 | 42 | 43 | 40 | 40 | 46 | 48 | 45 | 44 | 42 | 40 | 47 | 30 | 42 |
| | Hardness when dry-Hs(Wet) | 11 | 10 | 11 | 9 | 10 | 11 | 10 | 9 | 9 | 9 | 10 | 9 | 11 | 0 | 10 |
| | Hardness when re-wet with water | 35 | 34 | 31 | 32 | 29 | 31 | 38 | 38 | 36 | 33 | 32 | 31 | 37 | 30 | 33 |

TABLE 1-continued

|  | Example |  |  |  |  |  |  |  |  |  |  |  |  | Comparative Example |  |
|---|---|---|---|---|---|---|---|---|---|---|---|---|---|---|---|
|  | 1-1 | 1-2 | 1-3 | 1-4 | 1-5 | 1-6 | 1-7 | 1-8 | 1-9 | 1-10 | 1-11 | 1-12 | 1-13 | 1-1 | 1-2 |
| Whether or not volume changed with changes in hardness | No | No | No | No | No | No | No | No | No | No | No | No | No | No | No |
| Stress at break (MPa) | 9.0 | 8.8 | 8.9 | 8.6 | 8.4 | 8.3 | 9.1 | 9.2 | 8.8 | 8.5 | 8.3 | 8.3 | 9.4 | 7.3 | 7.8 |
| Ionic bond percentages (%) | 50 | 50 | 50 | 50 | 50 | 50 | 50 | 50 | 50 | 50 | 50 | 50 | 50 | 0 | 50 |
| Wet grip performance index | 110 | 109 | 112 | 110 | 111 | 111 | 110 | 109 | 108 | 109 | 110 | 110 | 112 | 100 | 108 |
| Dry grip performance index | 100 | 99 | 100 | 101 | 99 | 101 | 101 | 100 | 99 | 101 | 99 | 100 | 100 | 100 | 101 |

TABLE 2

|  |  | Example 2-1 | Comparative Example 2-1 |
|---|---|---|---|
| Amount (parts by mass) | Bromobutyl rubber | 100 | 100 |
|  | Chlorobutyl rubber | — | — |
|  | 1,2-Dimethylimidazole | 5 | — |
|  | 1-Butylimidazole | — | — |
|  | Carbon black | 1 | 1 |
|  | Silica | 1 | 1 |
|  | Silane coupling agent | 0.1 | 0.1 |
|  | Stearic acid | 2 | 2 |
|  | Zinc oxide | 2 | 2 |
|  | Vulcanization accelerator 1 | 2 | 2 |
|  | Vulcanization accelerator 2 | 2 | 2 |
|  | Sulfur | 1.5 | 1.5 |
| Evaluation results | Hardness of vulcanized rubber | 44 | 30 |
|  | Hardness when water-wet (Hs(Wet)) | 34 | 30 |
|  | Hardness when dry | 44 | 30 |
|  | Hardness when dry-Hs (Wet) | 10 | 0 |
|  | Hardness when re-wet with water | 34 | 30 |
|  | Whether or not volume changed with changes in hardness | No | No |
|  | Stress at break (MPa) | 8.8 | 7.3 |
|  | Ionic bond percentage (%) | 50.0 | 0 |
|  | Wet grip performance index | 108 | 100 |
|  | Dry grip performance index | 100 | 100 |

The tables demonstrate that the examples which had a hardness that reversibly changes with water, satisfied the relationships (1) and (2), and had a stress at break of 8.0 MPa or more exhibited improved overall performance in terms of wet grip performance and dry grip performance (as shown by the sum of the two indexes: wet grip performance and dry grip 10 performance).

The invention claimed is:

1. A tire, comprising a tire component at least partially comprising the rubber composition having a hardness that reversibly changes with water, satisfying the relationships (1) and (2) below, and having a stress at break of 8.0 MPa or more, $$\text{Hardness when dry} - \text{Hardness when water-wet} > 1 \quad (1)$$

wherein each hardness represents a JIS-A hardness at 25° C. of the rubber composition, $$0.90 < \text{Volume when water-wet/Volume when dry} < 1.01 \quad (2)$$

wherein each volume represents a volume at 25° C. of the rubber composition,
  wherein relationships (1) and (2) are of the rubber composition having been vulcanized;
  wherein the tire component is a tread, and
  wherein the rubber composition comprises:
    an imidazole compound;
    a rubber component; and
    carbon black, where the carbon black is present in a range of 0.5 parts by mass or more and 1.0 parts by mass or less per 100 parts by mass of the rubber component.

* * * * *